US010592573B1

United States Patent
Harada (10) Patent No.: US 10,592,573 B1
(45) Date of Patent: Mar. 17, 2020

(54) INTERACTIVELY SUGGESTING NETWORK LOCATION

(71) Applicant: Google LLC, Mountain View, CA (US)

(72) Inventor: Masanori Harada, Kanagawa (JP)

(73) Assignee: Google LLC, Mountain View, CA (US)

( * ) Notice: Subject to any disclaimer, the term of this patent is extended or adjusted under 35 U.S.C. 154(b) by 361 days.

(21) Appl. No.: 15/682,497

(22) Filed: Aug. 21, 2017

Related U.S. Application Data (63) Continuation of application No. 11/936,655, filed on Nov. 7, 2007, now abandoned.

(51) Int. Cl.
*G06F 7/00* (2006.01)
*G06F 16/9537* (2019.01)
*G06F 16/27* (2019.01)

(52) U.S. Cl.
CPC .......... *G06F 16/9537* (2019.01); *G06F 16/27* (2019.01)

(58) Field of Classification Search
CPC .................................................. G06F 16/285
USPC ................................ 707/708, 737, 769, 771
See application file for complete search history.

(56) References Cited

U.S. PATENT DOCUMENTS

| | | | |
|---|---|---|---|
| 6,564,213 B1 | 5/2003 | Ortega et al. | |
| 7,216,292 B1 * | 5/2007 | Snapper | G06F 17/243 715/234 |
| 7,499,940 B1 | 3/2009 | Gibbs | |
| 7,774,003 B1 * | 8/2010 | Ortega | H04W 4/029 455/456.2 |
| 7,908,287 B1 * | 3/2011 | Katragadda | G06F 17/276 707/767 |
| 8,005,919 B2 | 8/2011 | Mehanna | |
| 2004/0039988 A1 * | 2/2004 | Lee | G06F 16/95 715/226 |

(Continued)

FOREIGN PATENT DOCUMENTS

KR      2005002674      1/2005

OTHER PUBLICATIONS

'www.inquisitorx.com' [online] Copyright 2008, [retrieved on Jan. 29, 2009] Retrieved from Internet: URL< http://www.inquisitorx.com/ie/index_en.php > 1 page [previously cited and considered as: Inquisitor, Yahoo!, http://www.inquisitorx.com/ie/index_en.php,(accessed Jan. 29, 2009); 1 page].

(Continued)

*Primary Examiner* — Alexandria Y Bromell
(74) *Attorney, Agent, or Firm* — Fish & Richardson P.C.

(57) ABSTRACT

A computer-implemented method for suggesting character-combinations and one or more uniform resource locators in response to receiving a query prefix as input. The method includes receiving a query prefix as input, the query prefix being a character or character-combination. Character-combinations that completely or partially match the query prefix and are different from the query prefix are identified from a repository. The repository stores multiple pairs, each pair containing a character-combination and a list of identifiers pointing to network locations determined to be most relevant to the character-combination. One or more uniform resource locators are identified from the repository that have characters that completely or partially match the query prefix. The identified character-combinations and the one or more uniform resource locators are then suggested to a user.

12 Claims, 4 Drawing Sheets

(56) References Cited

U.S. PATENT DOCUMENTS

| | | | | |
|---|---|---|---|---|
| 2004/0143569 | A1* | 7/2004 | Gross | G06Q 10/107 |
| 2005/0283468 | A1* | 12/2005 | Kamvar | G06F 16/3325 |
| 2005/0289124 | A1* | 12/2005 | Kaiser | G06F 16/24522 |
| 2006/0075120 | A1* | 4/2006 | Smit | G06F 17/2288 |
| | | | | 709/227 |
| 2007/0050728 | A1* | 3/2007 | Vayssiere | G06F 17/276 |
| | | | | 715/780 |
| 2007/0088686 | A1 | 4/2007 | Hurst-Hiller | |
| 2008/0313564 | A1* | 12/2008 | Barve | G06F 3/0237 |
| | | | | 715/816 |
| 2009/0019038 | A1* | 1/2009 | Millett | G06F 16/31 |
| 2009/0119581 | A1* | 5/2009 | Velusamy | G06F 17/276 |
| | | | | 715/256 |
| 2009/0271744 | A1* | 10/2009 | Anders, Jr. | G06F 16/957 |
| | | | | 715/855 |

OTHER PUBLICATIONS

'www.cuil.com' [online] 2009, Cuil, Inc. [retrieved on Jan. 29, 2009] 1 page [previously cited and considered as: Cuil; CUil, Inc. http://www.cuil.com/; accessed Jan. 29, 2009; 1 page].

'www.yandex.ru' [online] Copyright 1997-2009 [retrieved on Jan. 29, 2009] Retrieved from Internet URL< http://www.yandex.ru/> 1 page [previously cited and considered as: Yandex, Yandex: http://www.yandex.ru/ (accessed Jan. 29, 2009; 1 page].

'www.ysearchblog.com' [online] "Inquisitor Expands to Firefox and IE; Yahoo!," Oct. 22, 2008, retrieved from Internet URL<http://www.ysearchblog.com/archives/000646.html,> 5 pages [previously cited and considered as: Yahoo!Search Blog: Inquisitor Expands to Firefox and IE].

Teevan et al., "Information Re-Retrieval: Repeat Queries in Yahoo's Logs," SIGIR 2007, ACM, Jul. 23-27, 2007, pp. 1-8.

* cited by examiner

INTERACTIVELY SUGGESTING NETWORK LOCATION

CROSS-REFERENCE TO RELATED APPLICATION

This is a continuation of U.S. application Ser. No. 11/936,655, filed on Nov. 7, 2007, the disclosure of which is considered part of and is incorporated by reference in the disclosure of this application.

TECHNICAL FIELD

This disclosure relates to interactively suggesting network locations.

BACKGROUND

Search engines, such as the Google search engine (offered by Google, Inc., Mountain View, Calif.) can receive search queries from a user and identify network locations, such as web pages of websites, that contain content relevant to the received search query. The user can be provided with a user interface including, e.g., a text box, into which the user can enter the query. The user can use an input device, such as a keyboard or a mouse, to enter the query into the text box. Subsequently, the user can submit the query to the search engine, e.g., by pressing the "Enter" key on the keyboard or by selecting an object in the user interface configured to receive the query, e.g., a "Search" or "Go" button.

Web browsers, such as Mozilla Firefox, offered by Mozilla Corporation (Mountain View, Calif.), include address bars into which a user can enter an identifier, e.g., uniform resource locator (URL), which can be a hyperlink pointing to a network location, e.g., the home page of a web site. If a user knows the URL to a web page, the user can enter the URL in the address bar, and, in response, the web browser can display the web page. The web browser can store the web pages visited by the user, such that when a user begins to enter the URL of a previously viewed web page, the web browser can automatically complete the URL in the address bar.

SUMMARY

In one example, a user can enter keywords related to a search query in a text box included in a user interface. When the user enters the first character of the query, the user can be presented with a list of identifiers, e.g., URLs, pointing to web pages of multiple websites that have previously been determined to be relevant to the first character of the query. The user can either select a URL from the list or enter a second character of the query. If the user enters a second character of the query, the user can be presented with an updated list of URLs pointing to web pages of websites that have previously been determined to be relevant to the text represented by the combination of the first character and the second character. In this manner, as the user enters characters into a text box, URLs, that may include a URL to a website that the user is searching for, can be suggested to the user.

In one aspect, a computer-implemented method is described. The method includes identifying one or more items of content residing at each network location of a plurality of suggested network locations, wherein an identified item of content comprises a plurality of characters, dividing each item of content into one or more character-combinations, a character-combination comprising at least one character, wherein each character-combination is a subset of the corresponding item of content, storing, in a computer-readable memory, a plurality of character-combinations obtained by dividing each item of content identified from each network location of the plurality of suggested network locations, and a plurality of identifiers, each identifier of the plurality of identifiers pointing to one network location of the plurality of suggested network locations, each identifier associated with one stored character-combination, wherein, prior to the storing, a level of relevance of the stored character-combination to the network location, to which the identifier associated with the character-combination points, is established, detecting an input related to a query, wherein the query is a string of characters, the input representing at least a portion of the query, determining that the detected input matches at least one stored character-combination, retrieving stored first identifiers associated with the stored character-combination that match the detected input, and providing the retrieved first identifiers, in response to the detecting.

This, and other aspects, can include one or more of the following features. Detecting the input does not require submitting the input. The plurality of suggested network locations can be selected based on factors including one or more of the rank of a network location, a number of links to the network location, a number of times the network location is accessed, a length of an identifier pointing to the network location, or a selection of the network location by a user. The method can further include detecting an addition of a character to the input, wherein a combination of the input and the added character represents an update to the at least a portion of the query, determining that the combination matches at least one new character-combination of the stored character-combinations, retrieving stored second identifiers associated with the stored character-combination that match the combination, and providing the retrieved second identifiers, in response to the detecting. Identifying one or more items of content residing at each network location of the plurality of suggested network locations can include traversing each network location of the plurality of suggested network locations to identify the one or more items of content that are representative of the corresponding network location. Dividing each item of content into one or more character-combinations can include dividing each item of content of the one or more items of content into a corresponding sequence including the character-combinations, wherein a character-combination in the sequence is a subset of the item of content, and wherein a character-combination in the sequence is a proper subset of a next character-combination in the sequence. Establishing a level of relevance of the stored character-combination to the network location, to which the identifier associated with the character-combination points can include determining a score representing the level of relevance of each character-combination in each sequence to each network location of the plurality of suggested network locations. The items of content can represent text residing at the network location and the items of content can be chosen based on one or more factors including anchor texts residing at identifiers pointing to the network location, network location title, edits performed at the network location, the identifier pointing to the network location, and text that yield the network location as a search result when included in a search query.

In another aspect, a computer program product, tangibly embodied in a computer-readable medium, operable to cause data processing apparatus to perform operations is described. The operations include identifying one or more items of content residing at each network location of a plurality of suggested network locations, wherein an identified item of content comprises a plurality of characters, dividing each item of content into one or more character-combinations, a character-combination comprising at least one character, wherein each character-combination is a subset of the corresponding item of content, storing, in a computer-readable memory, a plurality of character-combinations obtained by dividing each item of content identified from each network location of the plurality of suggested network locations, and a plurality of identifiers, each identifier of the plurality of identifiers pointing to one network location of the plurality of suggested network locations, each identifier associated with one stored character-combination, wherein, prior to the storing, a level of relevance of the stored character-combination to the network location, to which the identifier associated with the character-combination points, is established, detecting an input related to a query, wherein the query is a string of characters, the input representing at least a portion of the query, determining that the detected input matches at least one stored character-combination, retrieving stored first identifiers associated with the stored character-combination that match the detected input, and providing the retrieved first identifiers, in response to the detecting.

This, and other aspects, can include one or more of the following features. Detecting the input does not require submitting the input. The plurality of suggested network locations can be selected based on factors including one or more of the rank of a network location, a number of links to the network location, a number of times the network location is accessed, a length of an identifier pointing to the network location, or a selection of the network location by a user. The operations can further include detecting an addition of a character to the input, wherein a combination of the input and the added character represents an update to the at least a portion of the query, determining that the combination matches at least one new character-combination of the stored character-combinations, retrieving stored second identifiers associated with the stored character-combination that match the combination, and providing the retrieved second identifiers, in response to the detecting. Identifying one or more items of content residing at each network location of the plurality of suggested network locations can include traversing each network location of the plurality of suggested network locations to identify the one or more items of content that are representative of the corresponding network location. Dividing each item of content into one or more character-combinations can include dividing each item of content of the one or more items of content into a corresponding sequence including the character-combinations, wherein a character-combination in the sequence is a subset of the item of content, and wherein a character-combination in the sequence is a proper subset of a next character-combination in the sequence. Establishing a level of relevance of the stored character-combination to the network location, to which the identifier associated with the character-combination points can include determining a score representing the level of relevance of each character-combination in each sequence to each network location of the plurality of suggested network locations. The items of content can represent text residing at the network location and the items of content can be chosen based on one or more factors including anchor texts residing at identifiers pointing to the network location, network location title, edits performed at the network location, the identifier pointing to the network location, and text that yield the network location as a search result when included in a search query.

In another aspect, a system is described. The system includes a display device, and a server engine configured to perform operations. The operations include identifying one or more items of content residing at each network location of a plurality of suggested network locations, wherein an identified item of content comprises a plurality of characters, dividing each item of content into one or more character-combinations, a character-combination comprising at least one character, wherein each character-combination is a subset of the corresponding item of content, storing, in a computer-readable memory, a plurality of character-combinations obtained by dividing each item of content identified from each network location of the plurality of suggested network locations, and a plurality of identifiers, each identifier of the plurality of identifiers pointing to one network location of the plurality of suggested network locations, each identifier associated with one stored character-combination, wherein, prior to the storing, a level of relevance of the stored character-combination to the network location, to which the identifier associated with the character-combination points, is established, detecting an input related to a query, wherein the query is a string of characters, the input representing at least a portion of the query, determining that the detected input matches at least one stored character-combination, retrieving stored first identifiers associated with the stored character-combination that match the detected input, and providing the retrieved first identifiers, in response to the detecting.

This, and other aspects, can include one or more of the following features. Detecting the input does not require submitting the input. The plurality of suggested network locations can be selected based on factors including one or more of the rank of a network location, a number of links to the network location, a number of times the network location is accessed, a length of an identifier pointing to the network location, or a selection of the network location by a user. The operations can further include detecting an addition of a character to the input, wherein a combination of the input and the added character represents an update to the at least a portion of the query, determining that the combination matches at least one new character-combination of the stored character-combinations, retrieving stored second identifiers associated with the stored character-combination that match the combination, and providing the retrieved second identifiers, in response to the detecting. Identifying one or more items of content residing at each network location of the plurality of suggested network locations can include traversing each network location of the plurality of suggested network locations to identify the one or more items of content that are representative of the corresponding network location. Dividing each item of content into one or more character-combinations can include dividing each item of content of the one or more items of content into a corresponding sequence including the character-combinations, wherein a character-combination in the sequence is a subset of the item of content, and wherein a character-combination in the sequence is a proper subset of a next character-combination in the sequence. Establishing a level of relevance of the stored character-combination to the network location, to which the identifier associated with the character-combination points can include determining a score representing the level of relevance of each character-combination in each sequence to each network location of the plurality of suggested network locations. The items of content can represent text residing at the network location and the items of content can be chosen based on one or more factors including anchor texts residing at identifiers pointing to the network location, network location title, edits performed at the network location, the identifier pointing to the network location, and text that yield the network location as a search result when included in a search query.

The systems and techniques described here can provide one or more of the following advantages. Suggesting network locations to a user as the user is entering a query can reduce the time that the user spends searching for content if one of the suggested locations is the network location that the user desires to find. Displaying identifiers to network locations in response to receiving text related to content at the network location can negate the need for a user to remember the identifier to access the network location. Further, the user need not enter the entire search query or submit the search query, since suggested network locations are displayed when the user enters portions of the query in the user interface. Furthermore, the suggested network locations can be displayed quickly when the identifier to a network location includes minimal information.

In another aspect, a computer-implemented method is described. The method includes identifying one or more items of content residing at each network location of a plurality of suggested network locations, wherein an identified item of content comprises a plurality of characters, dividing each item of content into one or more character-combinations, a character-combination comprising at least one character, wherein each character-combination is a subset of the corresponding item of content, and storing, in a computer-readable memory, a plurality of character-combinations obtained by dividing each item of content identified from each network location of the plurality of suggested network locations, and a plurality of identifiers, each identifier of the plurality of identifiers pointing to one network location of the plurality of suggested network locations, each identifier associated with one stored character-combination, wherein, prior to the storing, a level of relevance of the stored character-combination to the network location, to which the identifier associated with the character-combination points, is established.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
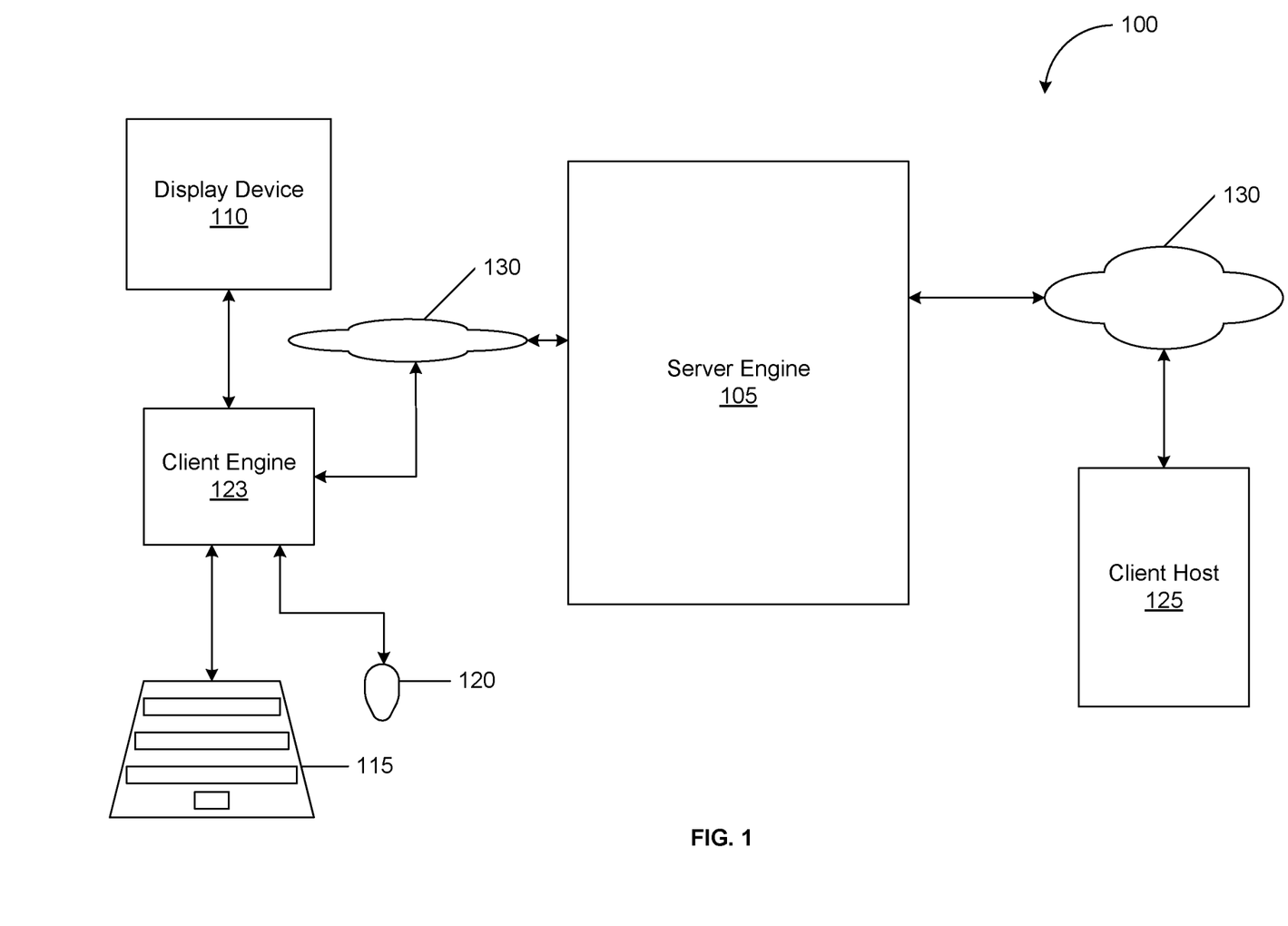
FIG. 1 is a schematic of an example of a system for suggesting network locations.

FIG. 1 depicts a schematic of an example of a system 100 for interactively displaying network locations in response to detecting the entry of a portion or portions of a search query. The system 100 includes a server engine 105, a client engine 123 operatively coupled to the server engine 105, a display device 110, and input devices, e.g., a keyboard 115, and a pointing device 120, such as a mouse, operatively coupled to the client engine 123. In some implementations, the server engine 105 can be a server computer, and the display device 110, and the input devices, 115 and 120, can be part of a client engine 123, e.g., computer system, such as a desktop computer, a laptop computer, a personal digital assistant (PDA), cellular telephones, and the like, operatively coupled to the server computer over one or more networks 130. The system 100 can include one or more content hosts 125, e.g., servers hosting one or more websites, to which the server engine 105 can be operatively coupled over one or more networks 130, e.g., local area networks (LANs), wide area networks (WANs), wireless (e.g., Wi-Fi) networks, mobile phone networks, the Internet, and the like.

The server engine 105 is configured to present a user with a user interface, and to detect input of a portion of a query, from the user, in the user interface, where the query can be, e.g., a string of text, and the input can be one or more characters of the string of text. For example, a user can enter a portion or portions of a query into a user interface displayed on the display device 110 operatively coupled to the client engine 123. The client engine 123 can transmit, to the server engine 105, the entered portion or portions of the query, which can serve as a request for suggestions. In response, the server engine 105 is configured to suggest one or more network locations to the user, e.g., by displaying a list of identifiers, e.g., URLs, each pointing to one of the suggested network locations, where the server engine 105 has previously determined that each of the suggested network locations includes content that is relevant to the portion of the query that has been provided as input. For example, the server engine 105 can transmit the list of identifiers to the client engine 123, which can, in turn, display the identifiers in the display device 110. In implementations where the network is the Internet, the network location can be a website and the URL corresponding to a network location can be web page, e.g., the home page, of the website. If the URL to the network location that the user is searching for, is included in the list of displayed URLs, then the user can select the desired URL, e.g., using one or both of the keyboard 115 or the mouse 120. In addition, information, such as the title of the website, can be displayed in addition to the URL.

Alternatively, if the displayed list of identifiers does not include a URL pointing to the network location that the user is searching for, then the user can continue to provide additional input to the query, where the additional input can be additional characters in the query. When the user enters a second character of the query in the user interface, the server engine 105 can detect an addition to the input, and combine the first character and the second character to form an updated portion of the query. The server engine 105 is configured to identify network locations that have been previously determined to include content relevant to the updated portion of the query, and display an updated list of URLs, where each identifier points to one of the new network locations. If the user finds the URL to a network location, that the user is searching for, in the new list, then the user can select the displayed URL. Network locations determined to be relevant to the input may or may not be determined to be relevant to the updated portion of the query, and, consequently, may or may not be included in the list of URLs displayed in response to detecting the updated portion of the query. Otherwise, the user can continue to add characters to the search query and the server engine 105 can continue to suggest network locations to the user.

The server engine 105 is configured to interactively perform the process of suggesting network locations as the user provides the query. For example, as the user provides input related to the query, the list including identifiers to network locations, can be displayed without requiring the user to provide additional input, such as pressing the "Enter" key on the keyboard. With each additional input, the server engine 105 can receive larger portions of the query, which can be more representative of the query, when compared to smaller portions of the query. The server engine 105 can update the list of URLs pointing to network locations for each portion of the query that is detected, where the probability that the network locations corresponding to the larger portions of the query are relevant to the query is greater than that for the network locations corresponding to the smaller portions of the query. Thus, the probability that the server engine 105 will identify a relevant network location increases as additional input to the query is received.

If the network location that the user is searching for is not included in the list of network locations even after the user has entered the entire query, the user can submit the query, e.g., by pressing the "Enter" key on the keyboard 115 or by selecting an object in the user interface, such as the "Search" or "Go" button. In response to receiving the query, a search engine (not shown), operatively coupled to the server engine 105, can identify network locations that contain content that satisfy the received query and present the identified network locations to the user.

FIGS. 2A-2D depict schematics of a user interface 205, displayed in a display device 110, into which the user can enter a query. In some implementations, the user interface 205 can be a web browser, e.g., Mozilla Firefox, displaying a web page of a website including an address bar, into which a user can enter a URL pointing to a network location, e.g., www.abcd.com, using, e.g., the keyboard 115, to access the network location. When the user submits a query into an object 210, e.g., a text box, in the user interface 205, instead of a URL pointing to a network location, the query can be provided to a search engine, e.g., the Google search engine, and URLs pointing to web pages of websites, that include content relevant to the query, can be displayed in the user interface 205.

Figure 2A:
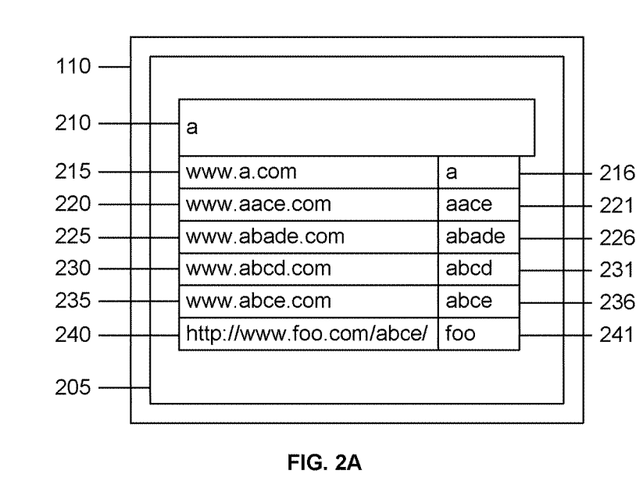
FIGS. 2A-2D are schematics of a display device displaying a user interface for entering a query.

FIG. 2A depicts a user interface 205 including an object 210, e.g., an address bar or a text box, into which a user has entered a portion of a query, e.g., by positioning a cursor controlled by the mouse 120, in the object 210, and entering characters using the keyboard 115. Alternatively, or in addition, the user can enter the query by pasting text that the user has cut or copied from a previous location. In the user interface 205 illustrated in FIG. 2A, the first letter of the query that the user enters into the object 210 is "a." As illustrated in FIG. 2A, when the user enters a portion of the query, "a," into the object 210, the server engine 105 can detect the input and display the URLs, www.a.com, www.aace.com, www.abade.com, www.abcd.com, www.abce.com, and http://www.foo.com/abce/, in corresponding objects 215, 220, 225, 230, 235, and 240, respectively. The URLs are not retrieved from the browser's search history, but, in contrast, are URLs to websites that the server engine 105 suggests to the user. In some implementations, the objects in which the URLs are displayed can be arranged one below the other, and adjacent to the object 210 into which the query is entered. Each URL of the displayed URLs can be a selectable object, e.g., a hyperlink, which the user can select, e.g., by positioning the cursor on the URL and pressing a button on the mouse 120. Selecting a URL can cause a web page, e.g., the home page, of the website, to which the URL points, to be displayed in the display device 110.

The server engine 105 can have previously determined that the network locations to which the URLs displayed in objects 215, 220, 225, 230, 235, and 240 correspond include content that is relevant to the portion of the query detected in the object 210. Further, the URLs in the list can be arranged according to a decreasing level of relevance, where, e.g., the server engine 105 has determined that www.a.com displayed in object 215 is more relevant to the entered portion of the query, "a," when compared to www.abce.com displayed in object 235. If the URL pointing to the network location that the user is searching for is included in any of the displayed objects, then the user can select the desired URL. If not, the user can continue to add input to the query in the object 210. The domain name of the displayed URLs need not start with the portion of the query detected in object 210. For example, as illustrated in object 240, the URL displayed, in response to detecting an input, "a," can be http://www.foo.com/abce/. In addition to the URLs, the title of the web page to which each URL points can be displayed adjacent to the URL. For example, the titles of the web pages to which the URLs in objects 215, 220, 225, 230, 235, and 240 point are displayed adjacent to the respective object in objects 216, 221, 226, 231, 236, and 241, respectively.

Figure 2B:
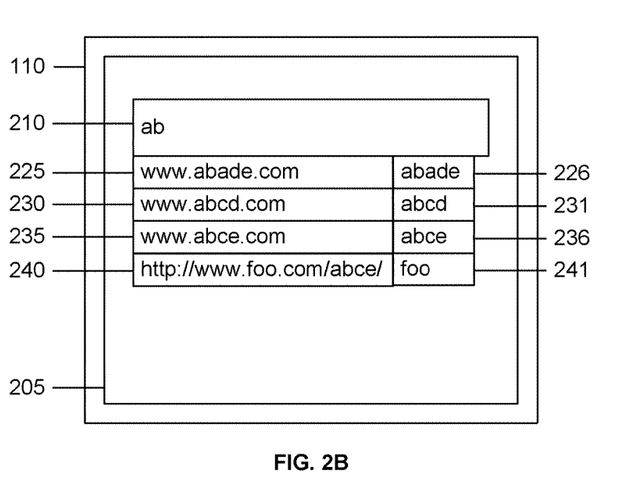

FIG. 2B depicts a schematic of a user interface 205 including the object 210 into which a second input to the query, "b," has been added. The server engine 105 is configured to detect that the second input, "b," has been added to the first input, "a," and to combine the first and second inputs to form an updated portion of the query, "ab." The server engine 105 can identify network locations that have been previously determined to include content relevant to the updated portion of the query. For example, as illustrated in FIG. 2B, the server engine 105 displays objects 225, 230, and 235, that include the URLs, www.abade.com, www.abcd.com, and www.abce.com, respectively, because the server engine 105 has previously determined that the content at the displayed websites includes the words, "abade," "abcd," and "abce," which are relevant to the updated portion of the query "ab." The server engine 105 can also display additional URLs to network locations determined to be relevant to the updated portion of the query. The server engine 105 can display a new list of URLs upon detecting the second input or filter the URLs displayed upon detecting the first input to display those URLs that are more relevant to the combination of the first and second inputs, than to the first input alone, or both. The server engine 105 can limit the number of URLs to relevant network locations to be displayed in the user interface to be less than a threshold, where the threshold can be determined based on factors including the size of the display device 110, user input, available space on the user interface 205, a relevance between the input and the website, and the like.

Figure 2C:
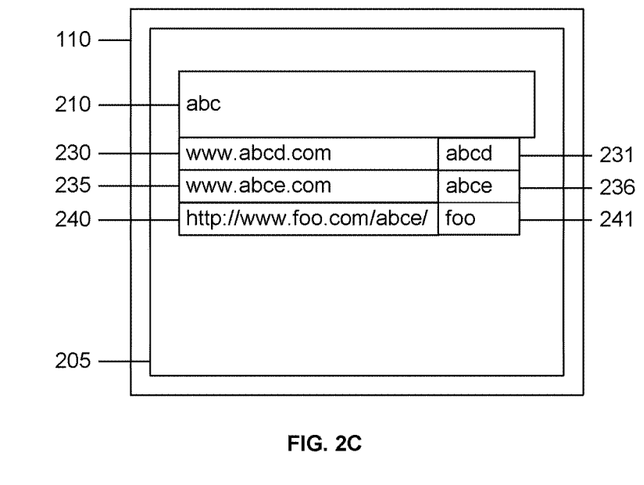
Figure 2D:
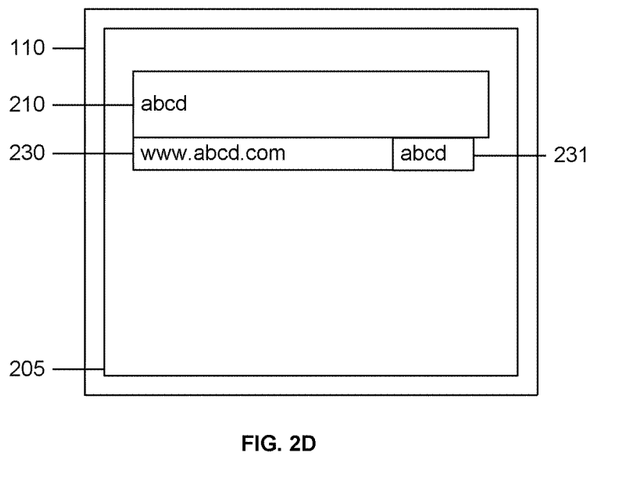

FIGS. 2C and 2D depict schematics of user interfaces 205 in which additional inputs to the query in the object 210 are detected. As illustrated in FIG. 2C, the server engine 105 detects the addition of input "c" to the combination "ab," updates the portion of the query to "abc," and, from the list of previously identified network locations, displays objects 230 and 235 including the URLs www.abcd.com and www.abce.com, respectively, adjacent to the object 210. Similarly, as illustrated in FIG. 2D, the server engine 105 detects the addition of input "d" to the combination "abc," updates the portion of the query to "abcd," and displays object 230 including the URL www.abcd.com adjacent to the object 210 in the user interface 205. If a URL to the network location that the user is searching for, is not displayed in the list of URLs after the user has entered the entire query, then the user can submit the query entered in the object 210 to a search engine operatively coupled to the server engine 105, e.g., by pressing the "Enter" key on the keyboard 115 or selecting an object (not shown) including text, e.g., "Search" or "Go," that is located in the user interface 205 adjacent to the object 210. The query that the user entered into the object 210 can be used as input to the search engine configured to identify network locations that contain content that satisfies the query. The list of identified network locations can be displayed in the user interface 205 and the user can select a URL of the desired network location. In other implementations, the input to the user interface can be a URL. In such implementations, as the server engine 105 can recognize the input of a partial URL and display URLs relevant to the input. If the user does not select one of the displayed URLs, but instead enters a complete URL and submits the URL, e.g., by pressing the "Enter" key, the user can be directed to the web page of the website to which the entered query points.

Figure 3:
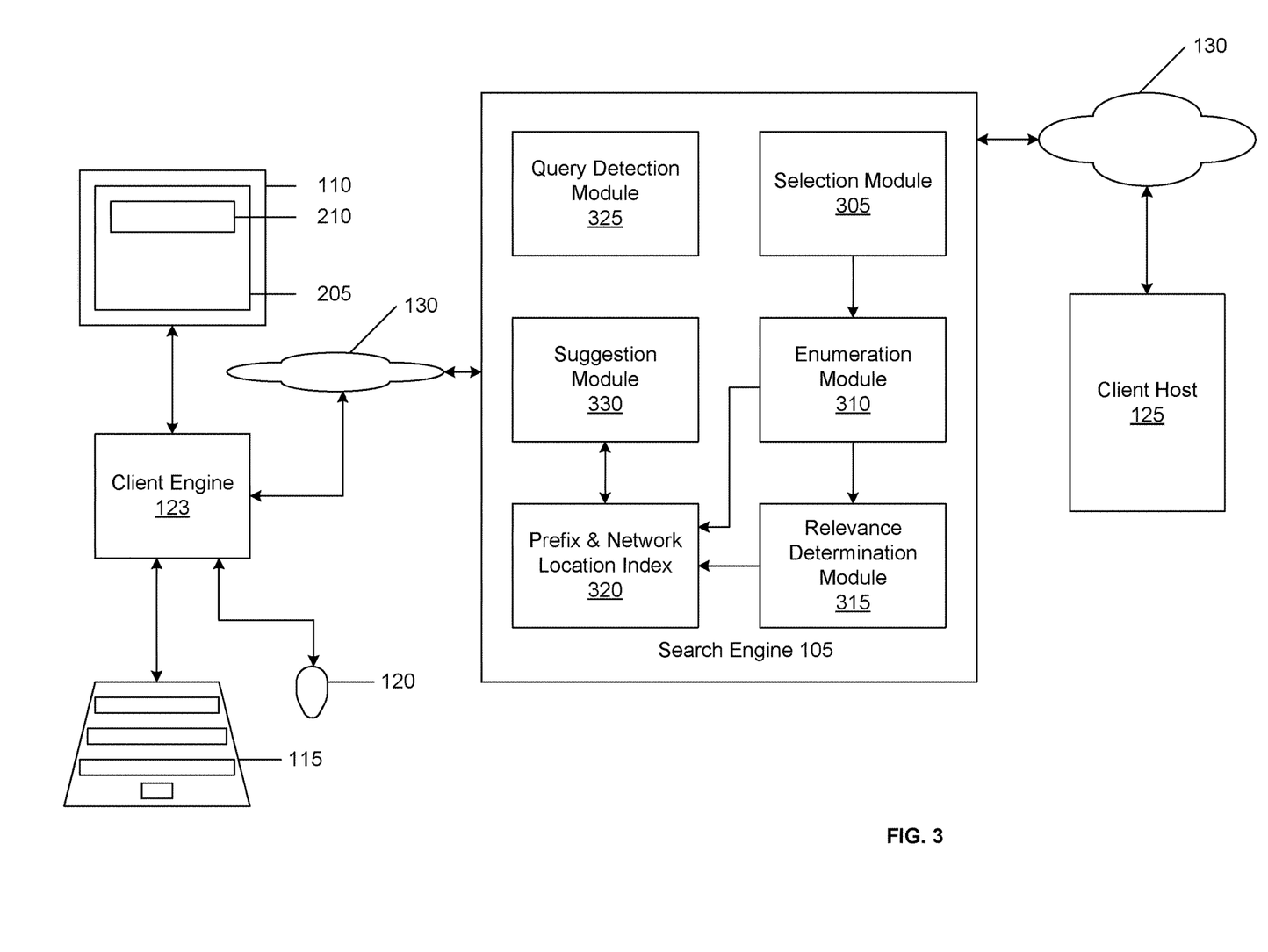
FIG. 3 is a schematic of an example of a system for suggesting network locations.

FIG. 3 depicts a schematic of an example of a server engine 105 configured to suggest network locations upon detecting the input of portions of a query. The server engine 105 can include a selection module 305 configured to receive multiple network locations, e.g., web pages of websites, located at one or more content hosts 125, and select network locations that can be suggested to a user in response to detecting the input of portions of a query by the user. The network locations that are included in the suggested network locations can be chosen based on factors including the popularity of the network location, which, in turn, can depend on factors including the rank, e.g., Google PageRank, of a network location, a number of links to the network location, e.g., the number of times the URL of a web page is found on any other web pages, a number of times the website is accessed, a length of the URL, a selection of the web page by a user, and the like. Further, some factors that are used to include a network location in the suggested network locations, e.g., the accessing of a web page by a user, can be given additional weighting than other factors. The selection module 305 can be configured to limit the number of network locations in the suggested network location to within a threshold and to periodically update the network locations in the suggested network locations. For example, based on the storage space available, the selection module 305 can be limited to select 10,0000 web sites for suggesting to a user.

The server engine 105 can include a crawler (not shown), e.g., residing in and operatively coupled to the selection module 305, configured to traverse each network location of the suggested network locations and to identify one or more items of content at each network location, e.g., one or more strings of text, such as words, at each web page, that are representative of the network location. Items of content can be chosen from a website based on factors including anchor texts on the links pointing to web pages of the website, title of web page at the website, manually edited web page names, the URL pointing to the home page of the website, the domain name or host name of the URL of the website, search queries that yield web pages of the website among search results, and the like.

The server engine 105 can include an enumeration module 310 configured to divide each identified word into a sequence of character-combinations, where each character-combination in the sequence is a subset of the identified word, and a character-combination in a sequence is a proper subset of the next character-combination in the sequence. A character-combination can contain at least one character and at most the number of characters of the word to which it corresponds. For example, the server engine 105 can identify the word "fish," on a web page of a website, and divide the word into a sequence containing four character-combinations, namely, "f," "fi," "fis," and "fish." Each character-combination of the sequence is a subset of the word "fish," and a character-combination in the sequence, e.g., "fi," is a proper subset of the next character-combination in the sequence, namely, "fis." In this manner, the enumeration module 310 can be configured to divide each identified word at each of the network locations in the list of suggested network locations into all possible prefixes for the identified word.

The server engine 105 can include a relevance determination module 315 configured to determine a relevance of each character-combination, e.g., each prefix of a word, into which an identified word has been divided, to the network location wherefrom the identified word was obtained. The relevance of a character-combination to a network location can be determined based on one or more factors including a number of times the identified word appears on the network location, a number of other words at the network location that contain a prefix that matches the character-combination, the uniqueness of the word to the network location, and the like. Further, the identified word in which the character-combination appears affects the relevance of the character-combination to a website. For example, if the character-combination appears as a prefix of the domain name of the web site, then the relevance determination module 315 can associate a higher relevance to the character-combination, than if the character-combination appears in the middle of a word in a web page of the website. For example, the server engine 105 can identify that the word, "fish," is representative of a website that contains content related to fishing. The enumeration module 310 can divide the identified word into a sequence including the prefixes, "f,", "fi,", "fis," and "fish." Several words on the website beginning with the prefix, "f," can be identified, and, consequently, the relevance determination module 315 can associate a high score representing the level of relevance of the prefix, "f," to the website, based on the instances when the prefix, "f," appears on the website. The relevance determination module 315 can be configured to associate weights to the score representing the level of relevance of a character-combination based, e.g., on the length of the character-combination. For example, the relevance determination module 315 can associate a low weight to the score of the prefix, "f," because not all the words on the website that begin with the prefix, "f," are necessarily strongly related to the website on fishing. Furthermore, the relevance determination module 315 can associate a higher score to a character-combination if the character-combination matches, entirely, an identified word, than if the character-combination were only a part of a word. For example, the relevance determination module 315 can determine that the character-combination "fish" is more relevant to a website containing information about fish, in comparison to a website about fishing.

Fewer words on the website that begin with the prefix, "fis," can be identified, and the score representing the level of relevance for the prefix, "fis," to the website can be low, because not many words including the prefix, "fis," appear on the website. The relevance determination module 315 can be configured to associate higher weights to the prefix, "fis,"

since the probability that a word containing the prefix, "fis," is related to fishing is higher than that for a word containing the prefix, "f," alone. In this manner, the relevance determination module 315 can determine a score representing a level of relevance for each character-combination of a sequence to a network location.

Further, the relevance determination module 315 can be configured to determine scores representing levels of relevance of each character-combination to all the network locations in the list of suggested network locations. For example, the selection module 305 can identify the word "fish" from a website including content related to fishing, and "food" from another website including content related to food. The enumeration module 310 can divide the words, "fish" and "food" into two sequences containing a total of eight character-combinations, namely, "f," "fi," "fis,", and "fish," and "f," "fo," "foo," and "food," respectively. The relevance determination module 315 can determine scores representing levels of relevance of each of the seven character-combinations to both network locations. For example, the prefix, "f," is relevant to both network locations while the prefix, "foo," is more relevant to the website describing food and the prefix, "fis," is more relevant to the website describing fishing. In this manner, for each character-combination of each sequence obtained from each identified item of content at each of the suggested network locations identified by the selection module 305, the relevance determination module 315 can determine a score representing a level of relevance of the character-combination to each of the suggested network locations.

The server engine 105 can include a prefix and network location index 320 which can be a repository storing multiple pairs, where a pair contains a character-combination in a sequence, and a list of identifiers pointing to network locations determined to be most relevant to the character-combination. The most relevant network locations can be chosen by comparing the scores representing the levels of relevance of each prefix to each of the suggested network locations, and identifying a number of network locations with the highest scores, where the number can be determined based on factors including the storage capacity of the server engine 105, user input, the display settings of the user interface 205, and the like. For example, if 100 network locations are chosen by the selection module 305 for suggesting, in order to decrease the amount of space occupied by the list of identifiers displayed on the display device 110 as the user enters a query into the object 210, the number of most relevant network locations corresponding to a character-combination can be limited to, e.g., 10 locations. If more space is available to display the list of identifiers, the number of most relevant network locations corresponding to a character-combination can be increased. Further, if more storage space is available for storing the character-combinations of the network locations and the most relevant network locations, then the number of relevant network locations can be increased.

The server engine 105 can include a query detection module 325 configured to detect an input in the object 210 in the user interface 205, where the input represents at least a portion of the query. The user can commence entering the query into the object 210, e.g., one character at a time, or multiple characters at a time. For example, the object 210 can be a text box into which the user can position a cursor and enter characters, e.g., using the keyboard 115. Alternatively, the input can be pasted text, cut or copied from another location. The query detection module 325 can detect input into the object 210 without requiring the user to submit the query, e.g., by pressing the "Enter" key on the keyboard 115 after entering a character into the text box represented by the object 210.

The server engine 105 can include a suggestion module 330 configured to compare the received input, representing a portion of the query, with the character-combinations in the prefix and network location index 320, identify a character-combination that matches the received input, and, further, to retrieve the identifiers of network locations, corresponding to the identified character-combination, stored in the prefix and network location index 320. The server engine 105 can interactively display the retrieved identifiers, e.g., URLs, pointing to each of the identified network locations in the user interface 205, e.g., adjacent to the object 210, in response to detecting the input. If one of the displayed identifiers matches the identifier of a network location that the user is searching for, the user can select the identifier and the server engine can access the network location to which the identifier points, and display the network location in an interface, e.g., the web browser, in the display device 110. In some implementations, the contents of the accessed network location can be displayed in the user interface 205 into which the user entered portions of the query. Alternatively, the contents of the accessed network location can be displayed in a separate user interface.

If the displayed list of URLs of the identified network locations does not contain that of the network location that the user is searching for, the user can continue to provide additional input to the object 210, e.g., the user can add characters to the previous input. The query detection module 325 can detect the addition to the input, where the combination of the previous input and the addition to the input can represent an update to the portion of the query that the user is entering into the object 210. The suggestion module 330 can compare the combination of the input and the addition to the input to the prefix and network location index 320 to identify a character-combination that matches the combination, and, further, to retrieve identifiers pointing to network locations corresponding to the combination, that are stored in the prefix and network location index 320. Identifiers pointing to the identified network locations can be displayed in the user interface 205 to allow the user to select one of the displayed identifiers. In this manner, in response to each addition of input to the query in the object 210, the user can be presented with one or more identifiers pointing to network locations that may include the network location that the user is searching for.

In some instances, the prefix and network location index 320 may not contain the input detected by the query detection module 325, and the server engine 105 may not display any identifiers while the user is entering the query into the object 210 because no character-combination matching the input is available in the prefix and network location index 320. Subsequent to entering the query, the user can submit the query, e.g., by pressing the "Enter" key on the keyboard 115. The server engine 105 can be operatively coupled to a search engine which can receive the submitted query, and, identify one or more network locations that include content that satisfies the submitted query. The results of the search, e.g., identifiers pointing to the network locations that satisfy the submitted query, can be displayed in the display device, e.g., either in the user interface 205 or in a different user interface. The user can select one of the displayed identifiers from among the search results to access a desired network location. The search engine can be configured to display results in a decreasing order of relevance, where the identifier to the network location determined to be most relevant to the query is displayed first. In other implementations, the input to the user interface can be a URL. In such implementations, as the server engine 105 can recognize the input of a partial URL and display URLs relevant to the input. If the user does not select one of the displayed URLs, but instead enters a complete URL and submits the URL, e.g., by pressing the "Enter" key, the user can be directed to the web page of the website to which the entered query points.

The server engine 105 can be configured to identify the most relevant search results identified by the search engine, and cause the selection module 305 to include the one or more network locations from among the identified search results, particularly the network location that the user selects, in the list of network locations for suggesting to a user. Further, the server engine 105 can be configured to communicate with other content hosts 125 over the network to identify most popular network locations and periodically update the network locations in the selection module 305. In this manner, the server engine 105 can be configured to continuously add websites to the selection module 305 and to cause the selection module 305 to remove websites that are no longer popular or no longer frequently accessed by the user or both.

Figure 4:
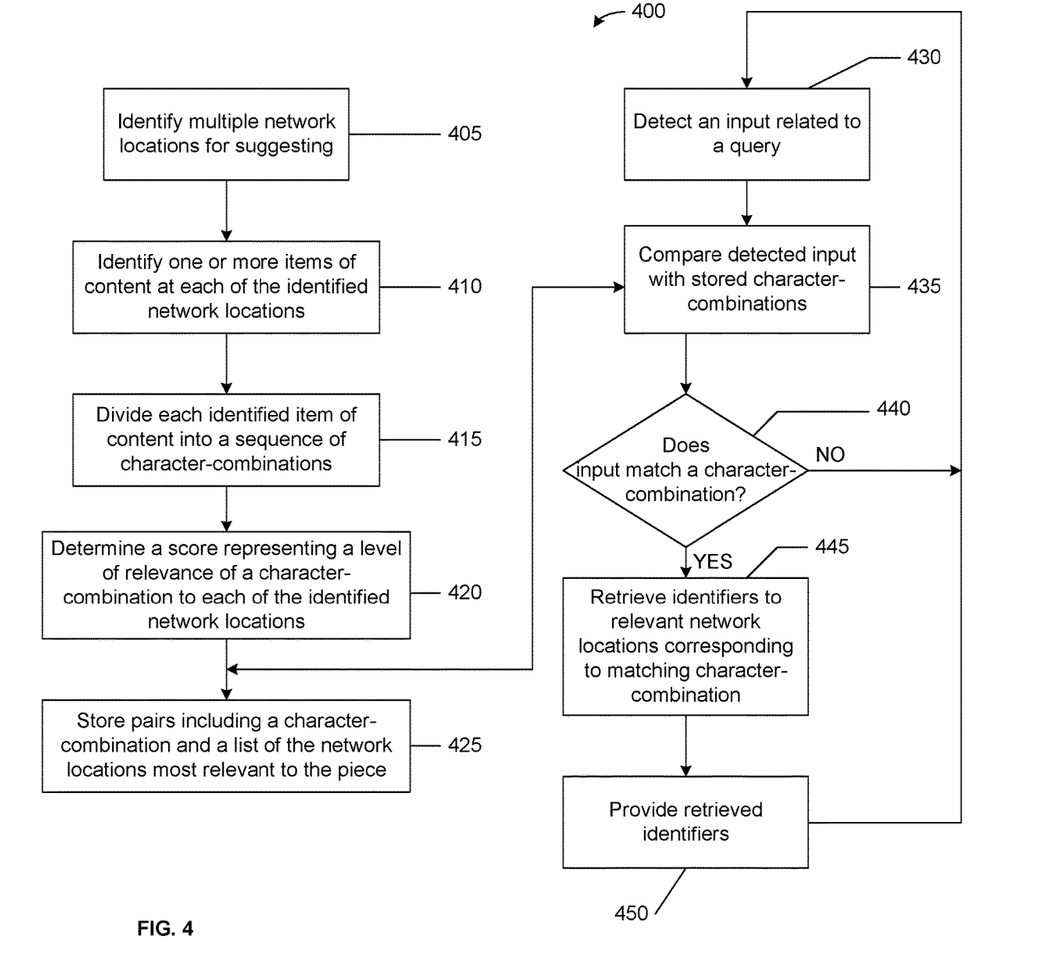
FIG. 4 is a flow chart of an example of a process for suggesting network locations.

FIG. 4 depicts a flow chart of an example of a process 400 for suggesting network locations upon detecting the input of portions of a query. The process 400 can identify multiple network locations, for suggesting to a user, upon detecting an input from the user at 405. For example, the selection module 305 can identify multiple network locations, e.g., web pages of websites, that reside at one or more content hosts 125, where the content hosts 125 are operatively coupled to the server engine 105 through the network 130, namely, the Internet.

The process 400 can identify one or more items of content, at each of the identified network locations, that are representative of the network location where the identified item of content resides at 410. For example, the server engine 105 can include a crawler configured to traverse each network location of the identified multiple network locations to identify items of content, e.g., words and word phrases, that represent the network location.

The process 400 can divide each item of content at each of the identified network locations into a sequence of character-combinations at 415, where a character-combination includes at least one character, each character-combination is a subset of the identified item of content, and a character-combination in a sequence is a proper subset of the next character-combination in the sequence. For example, the enumeration module 310 can divide an identified item of content, e.g., the word "fish," into a sequence containing character-combinations "f," "fi," "fis," and "fish." Each character-combination, namely, "f," "fi," "fis," and "fish," is a subset of the word "fish," and a character-combination in the sequence is a proper subset of the next character-combination in the sequence. In some implementations, the identified item of content can be a word phrase and can include more than one word. In such implementations, a character-combination can include characters and a space. For example, if the identified item of content is "paper weight," then sequence can include character-combinations such as "paper," "paper w," "paper we," and the so on.

The process 400 can determine a score representing a level of relevance of a character-combination to each of the identified network locations at 420. For example, the relevance determination module 315 can determine that a character-combination in a sequence, e.g., the character-combination, "f," is relevant to all network locations that contain identified words that begin with "f," and can assign a score to the level of relevance of the character-combination and all the network locations that contain identified words that include the character-combination as a prefix. Further, the relevance determination module 315 can assign weightings to each score representing the level of relevance, depending upon, e.g., the frequency of occurrence of a character-combination at the network location.

Further, the relevance determination module 315 can identify the most relevant network locations corresponding to each character-combination, based on the score representing the level of relevance. The process 400 can store pairs including a character-combination and a corresponding list of identifiers pointing to the network locations determined to be most relevant to the character-combination at 425. The score representing the level of relevance of a network location can be greater than a threshold such that only those relevant network locations that are determined to have scored more than the threshold are stored in each pair. For example, the prefix and network location index 320 can store pairs including a character-combination and network locations determined to be most relevant to the character-combination, based on the score representing the level of relevance of a network location to the character-combination. In this manner, the process 400 can previously determine character-combinations, that represent prefixes of words at network locations, and a list of network locations to which the character-combinations are relevant.

The process 400 can detect an input related to a query at 430. For example, the query detection module 325 can detect that a user has input a portion of a query in the object 210 in the user interface 205 displayed in the display device 110.

The process 400 can compare the input with the character-combinations in the stored pairs at 435. For example, the suggestion module 330 can receive the input and compare the input to the character-combinations stored in the prefix and network location index 320 to identify a matching character-combination.

The process 400 can check if the input matches a character-combination in the stored pairs at 440. Since the input in the object 210 corresponds to a starting portion of a query, the input can be considered as a prefix to the query. Since each character-combination in a sequence is a prefix to a corresponding word, if the input matches a character-combination in the stored pairs, then the prefix corresponding to a portion of a query matches a previously identified prefix to an identified word, and the probability that the query will, either completely or partially, match the identified word increases.

If the input matches a character-combination in the stored pairs, then the process 400 can retrieve the list of identifiers corresponding to the one or more network locations corresponding to the matching character-combination, where the list of identifiers is stored among the stored pairs, at 445. For example, the suggestion module 330 can identify the list of network locations that correspond to a character-combination from the prefix and network location index 320.

The process 400 can provide the list of retrieved identifiers in response to detecting the input of the portion of the query at 450. For example, the server engine 105 can display a list of identifiers, e.g., URLs, to each network location of the identified network locations in the user interface 205, e.g., adjacent to the object 210. The server engine 105 can interactively display the list of identifiers without requiring any interaction from the user other than entering the input. The user can continue to add input to the query. The process 400 can be repeated as long input is detected and retrieved identifiers can be presented to the user. If the input does not match a character-combination in the stored pairs or if the user continues to provide input to the query in the object 210, the process 400 can detect the additional input to the query at 430, and the process 400 can be repeated.

In this manner, the process 400 can interactively display identifiers to network locations to a user as the user enters a query in a user interface. If the user finds an identifier to a desired network location, then the user can select the identifier. If not, the user can enter and submit the entire query, which can be received as input to a search engine. The search engine can identify network locations that contain content that satisfies the query, and display the identifiers in the user interface. The process 400 can track the displayed identifiers, and include the network locations, to which the identifiers correspond, to the suggested network locations, thereby updating the suggested network locations.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, the system 100 can be a desktop file system, which can include one or more storage devices on which content is stored. The desktop file system can include a server engine that can identify several items of content, e.g., files, stored on the one or more storage devices, based on factors, such as the file type, the number of times a file has been accessed, and the like. The server engine can identify items of content, e.g., words, in each file, and divide each word into a sequence of character-combinations. Subsequently, the server engine can determine a score representing a level of relevance of each character-combination to each of the identified files, and store each character-combination and the files that have been determined to be most relevant to the corresponding character-combination. When a user searches for a file on the desktop file system, the server engine can detect the input of a portion of a query, and, interactively, display identifiers that point to locations, where files relevant to the portion of the query, are located. If the identifier to a file that the user is searching for is included in the list of displayed identifiers, then the user can select the identifier without having to enter the entire search query and cause the desktop file system to search for the file.

In some implementations, the user can input the URL pointing to the network location in the object 210 as the search query, where the URL begins with "www." The server engine 105 can be configured to ignore "www," and use the first character that follows "www" as the input to the query. In some implementations, if the speed at which the user enters the query into the user interface is greater than a threshold, then the server engine can pause the process for comparing the input to the stored pairs because the speed at which the query is entered may be greater than the speed at which the server engine can process the input. In such implementations, when the server engine detects a pause in input to the query, then the server engine can combine all the inputs in the user interface and treat the combined input as a portion of the query.

Instructions to perform the operations described can be stored on a software readable medium or at a remote location operatively coupled to the server engine 105. The instructions can be made available to a user as a plug-in where the user can download and include the instructions with other software applications. Accordingly, other implementations are within the scope of the following claims.

What is claimed is:

1. A computer-implemented method comprising:
    creating a repository, including:
        identifying multiple network locations that reside at one or more content hosts,
        identifying one or more items of content associated with each identified network location,
        dividing each identified item of content at each of the identified network locations into character-combinations that each include at least one character and that each is a subset of the identified item of content,
        determining a score representing a level of relevance of each character-combination to each identified network location with which the character-combination is associated,
        determining most relevant network locations corresponding to each character-combination based on the score representing the level of relevance, and
        storing pairs of a character-combination and a corresponding list of identifiers pointing to the network locations determined to be most relevant to the character-combination;
    receiving a query prefix as input, the query prefix being a character or character-combination;
    identifying, from the repository, character-combinations that completely or partially match the query prefix, wherein the repository stores multiple pairs, each pair containing a character-combination and a list of identifiers pointing to network locations determined to be most relevant to the character-combination;
    identifying one or more uniform resource locators from the repository that have characters that completely or partially match the query prefix; and
    suggesting the identified character-combinations and the one or more uniform resource locators in response to receiving the query prefix as input.

2. The computer-implemented method of claim 1, wherein identifying character-combinations that completely or partially match the query prefix includes identifying at least one word or word phrase from the repository that contains a same character-combination as the query prefix.

3. The computer-implemented method of claim 1, wherein identifying one or more uniform resource locators that have characters that completely or partially match the query prefix includes identifying character-combinations in uniform resource locators that contain a same character-combination as the query prefix.

4. The computer-implemented method of claim 1, wherein identifying one or more items of content associated with each identified network location includes identifying at least one of:
    (i) anchor text associated with one or more links pointing to the network location;
    (ii) a domain name for the network location;
    (iii) a search query for which a search result that identifies a resource at a network location was provided by a search engine in response to the search query; or
    (iv) text of a uniform resource locator associated with the network location.

5. A system comprising:
one or more computers and one or more storage devices storing instructions that are operable, when executed by the one or more computers, to cause the one or more computers to perform operations comprising:
creating a repository, including:
identifying multiple network locations that reside at one or more content hosts,
identifying one or more items of content associated with each identified network location,
dividing each identified item of content at each of the identified network locations into character-combinations that each include at least one character and that each is a subset of the identified item of content,
determining a score representing a level of relevance of each character-combination to each identified network location with which the character-combination is associated,
determining most relevant network locations corresponding to each character-combination based on the score representing the level of relevance, and
storing pairs of a character-combination and a corresponding list of identifiers pointing to the network locations determined to be most relevant to the character-combination;
receiving a query prefix as input, the query prefix being a character or character-combination;
identifying, from a repository, character-combinations that completely or partially match the query prefix, wherein the repository stores multiple pairs, each pair containing a character-combination and a list of identifiers pointing to network locations determined to be most relevant to the character-combination;
identifying one or more uniform resource locators from the repository that have characters that completely or partially match the query prefix; and
suggesting the identified character-combinations and the one or more uniform resource locators in response to receiving the query prefix as input.

6. The system of claim 5, wherein identifying character-combinations that completely or partially match the query prefix includes identifying at least one word or word phrase from the repository that contains a same character-combination as the query prefix.

7. The system of claim 5, wherein identifying one or more uniform resource locators that have characters that completely or partially match the query prefix includes identifying character-combinations in uniform resource locators that contain a same character-combination as the query prefix.

8. The system of claim 5, wherein identifying one or more items of content associated with each identified network location includes identifying at least one of:
(i) anchor text associated with one or more links pointing to the network location;
(ii) a domain name for the network location;
(iii) a search query for which a search result that identifies a resource at a network location was provided by a search engine in response to the search query; or
(iv) text of a uniform resource locator associated with the network location.

9. A non-transitory computer-readable medium storing instructions that, when executed by one or more computers, cause the one or more computers to perform operations comprising:
creating a repository, including:
identifying multiple network locations that reside at one or more content hosts,
identifying one or more items of content associated with each identified network location,
dividing each identified item of content at each of the identified network locations into character-combinations that each include at least one character and that each is a subset of the identified item of content,
determining a score representing a level of relevance of each character-combination to each identified network location with which the character-combination is associated,
determining most relevant network locations corresponding to each character-combination based on the score representing the level of relevance, and
storing pairs of a character-combination and a corresponding list of identifiers pointing to the network locations determined to be most relevant to the character-combination;
receiving a query prefix as input, the query prefix being a character or character-combination;
identifying, from a repository, character-combinations that completely or partially match the query prefix, wherein the repository stores multiple pairs, each pair containing a character-combination and a list of identifiers pointing to network locations determined to be most relevant to the character-combination;
identifying one or more uniform resource locators from the repository that have characters that completely or partially match the query prefix; and
suggesting the identified character-combinations and the one or more uniform resource locators in response to receiving the query prefix as input.

10. The non-transitory computer-readable medium of claim 9, wherein identifying character-combinations that completely or partially match the query prefix includes identifying at least one word or word phrase from the repository that contains a same character-combination as the query prefix.

11. The non-transitory computer-readable medium of claim 9, wherein identifying one or more uniform resource locators that have characters that completely or partially match the query prefix includes identifying character-combinations in uniform resource locators that contain a same character-combination as the query prefix.

12. The non-transitory computer-readable medium of claim 9, wherein identifying one or more items of content associated with each identified network location includes identifying at least one of:
(i) anchor text associated with one or more links pointing to the network location;
(ii) a domain name for the network location;
(iii) a search query for which a search result that identifies a resource at a network location was provided by a search engine in response to the search query; or
(iv) text of a uniform resource locator associated with the network location.

* * * * *

UNITED STATES PATENT AND TRADEMARK OFFICE
CERTIFICATE OF CORRECTION

PATENT NO. : 10,592,573 B1
APPLICATION NO. : 15/682497
DATED : March 17, 2020
INVENTOR(S) : Harada Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 408 days.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*